(12) United States Patent
Horvatich et al.

(10) Patent No.: US 10,937,259 B1
(45) Date of Patent: Mar. 2, 2021

(54) SMART VEHICLE HEALTH SYSTEM

(71) Applicant: Armorworks Holdings, Inc., Chandler, AZ (US)

(72) Inventors: Valent Horvatich, Scottsdale, AZ (US); David A. Bosen, Tempe, AZ (US); Brad Belcher, Chandler, AZ (US)

(73) Assignee: Armorworks Holdings, Inc., Chandler, AZ (US)

( * ) Notice: Subject to any disclaimer, the term of this patent is extended or adjusted under 35 U.S.C. 154(b) by 0 days.

(21) Appl. No.: 16/363,595

(22) Filed: Mar. 25, 2019

Related U.S. Application Data

(60) Provisional application No. 62/647,440, filed on Mar. 23, 2018.

(51) Int. Cl.
*G07C 5/08* (2006.01)
*G07C 5/00* (2006.01)
*H04L 29/08* (2006.01)

(52) U.S. Cl.
CPC ............ *G07C 5/085* (2013.01); *G07C 5/008* (2013.01); *G07C 5/0825* (2013.01); *H04L 67/12* (2013.01)

(58) Field of Classification Search
CPC ...... G07C 5/085; G07C 5/008; G07C 5/0825; H04L 67/12
See application file for complete search history.

(56) References Cited

U.S. PATENT DOCUMENTS

| | | | |
|---|---|---|---|
| 6,339,745 B1* | 1/2002 | Novik | G07C 5/008 342/357.31 |
| 8,754,943 B2* | 6/2014 | Klaerner | B60Q 1/0023 348/148 |
| 10,234,538 B1* | 3/2019 | Fortney | H04L 63/0435 |
| 10,429,253 B2* | 10/2019 | Carkner | G01L 1/16 |
| 2004/0019577 A1* | 1/2004 | Abdel-Malek | G07C 5/008 |
| 2004/0226726 A1* | 11/2004 | Holland | A62C 13/22 169/62 |
| 2007/0278057 A1* | 12/2007 | Wereley | B60N 2/501 188/267.1 |
| 2009/0027229 A1* | 1/2009 | Fortson | H04Q 9/00 340/870.07 |
| 2009/0132128 A1* | 5/2009 | Marriott | B60R 22/48 701/45 |
| 2010/0179730 A1* | 7/2010 | Hiemenz | B60N 2/502 701/45 |
| 2011/0046842 A1* | 2/2011 | Smith | G07C 5/008 701/31.4 |

(Continued)

*Primary Examiner* — Rufus C Point
(74) *Attorney, Agent, or Firm* — James L Farmer

(57) ABSTRACT

Apparatus and methods are provided for a smart vehicle health system. In one embodiment the system includes a smart vehicle equipped with sensors configured to detect health parameters indicative of a relative health of certain vehicle components or systems. A processor is configured to generate a data signal containing vehicle component or system health information based on data from the sensors, and to transmit the data signal from the vehicle to a remotely located data receiver configured to receive the data signal. The system may further include a monitor connected to the data receiver and configured to present a plurality of selectable visual displays indicating the health of the vehicle components or systems based on the vehicle component or system health information in the transmitted data signal.

16 Claims, 4 Drawing Sheets

(56) References Cited

U.S. PATENT DOCUMENTS

| | | | | |
|---|---|---|---|---|
| 2012/0089474 A1* | 4/2012 | Xiao | ................ | G06Q 10/06311 |
| | | | | 705/26.4 |
| 2014/0076225 A1* | 3/2014 | Smith | .................... | B63B 59/08 |
| | | | | 114/222 |
| 2016/0185385 A1* | 6/2016 | Di Censo | ................. | B62D 6/00 |
| | | | | 701/41 |

* cited by examiner

SMART VEHICLE HEALTH SYSTEM

This application claims priority to Provisional patent application No. 62/647,440, the entire contents of which are hereby incorporated by reference.

TECHNICAL FIELD

The technical field of the present invention relates to the use of survivability systems in military vehicles, including the use of shock attenuating seats and ballistic resistant armor panels.

DESCRIPTION OF THE EMBODIMENTS

Figure 1:
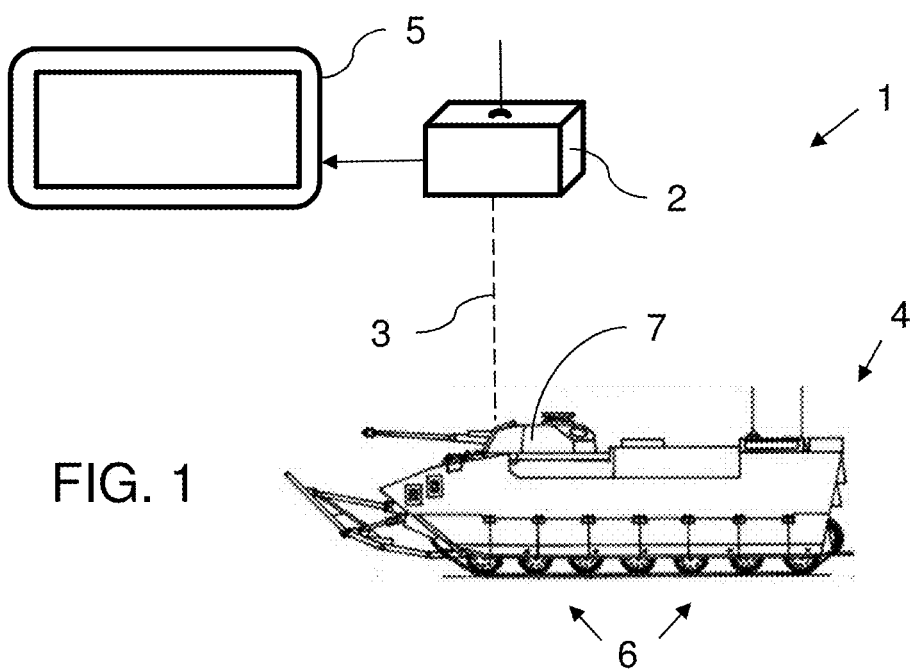
FIG. 1 is a schematic representation of a smart vehicle health system in accordance with the present disclosure showing a vehicle with sensors, a remote data receiver, and a data monitor.

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

The inventors have discovered a need for a battle management system with the capability to provide real time and/or recorded data about vehicle capability and the health status of vehicle survivability systems. Referring now to the drawing Figures, an exemplary smart vehicle health system is indicated generally at reference numeral 1, and includes a remote data receiver 2 connected through a wireless link 3 to a smart vehicle 4; and a data monitor 5, depicted here as a visual graphic display, connected to the receiver 2. A series of sensors 6 strategically located in the smart vehicle are configured to detect health parameters indicative of a relative health of certain vehicle components or systems. In one embodiment the sensors are imbedded in vehicle survivability systems, such as sensors in blast protective seats, vehicle fire suppression systems, vehicle armor systems, and active protection systems to provide health data for assessing the survivability readiness of the vehicle. The smart vehicle health system may further include sensors for detecting system health parameters associated with the vehicle powertrain, vehicle mobility (wheels/tracks), ammunition capacity and other vehicle components or systems. The sensors are connected to a processor 7 that collects sensor data and transmits a data signal containing vehicle component or system health information from the vehicle to the remote data receiver 2.

The data monitor 5 may comprise a visual display system capable of producing graphical displays, tabulated numerical information, or a simple alert system that monitors the data signal and issues an audible or visible alert as required. In one such embodiment the system 1 is configured to organize the vehicle health data into a visual representation of the vehicle and its key components for display on data monitor 5. The visual data representation may enable battle field managers to quickly asses the needs of a multiple vehicle unit equipped with smart system 1, and advantageously redirect forces or provide medevac without the risks associated with direct verbal communication with the unit. In one embodiment the data monitor 5 is configured to toggle between a series of selectable visual displays showing various types of vehicle health data. The monitor and/or the data receiver may contain a processor in the form of a CPU or equivalent device capable of generating the visual displays from the data signal. The system 1 may further include processing means for collecting and downloading recorded data for vehicle preventative maintenance to aid in the identification of critical survivability areas needing attention, such as identifying the presence of unseen damage to armor or blast seats.

Figure 2:
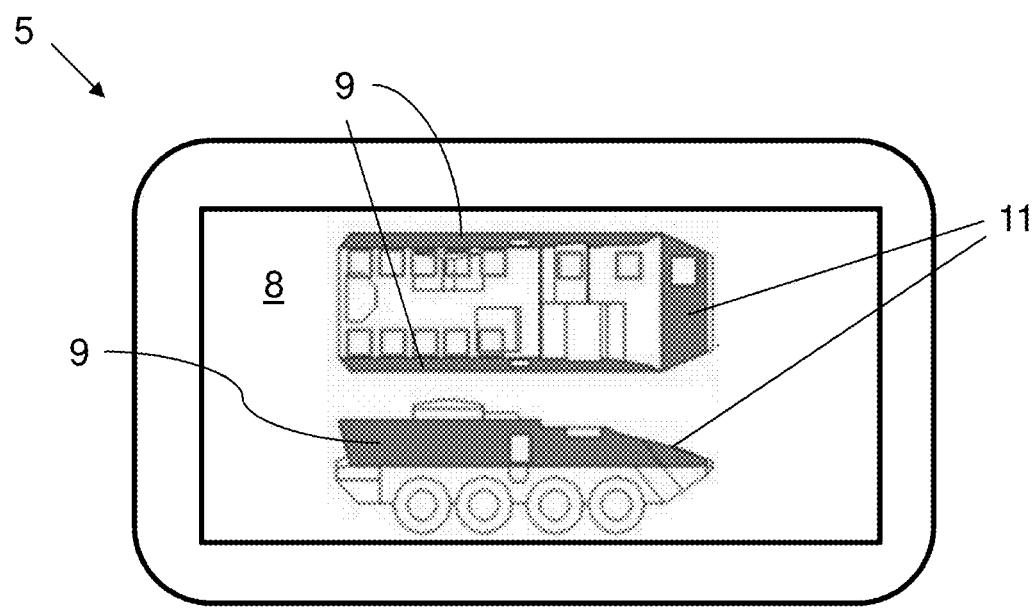
FIG. 2 is a close-up representation of the data monitor of FIG. 1 with an exemplary visual graphic display showing the relative health of vehicle armor panels.

FIG. 2 is an example of data monitor 5 with an exemplary vehicle exterior armor health display 8 that shows the condition of the vehicle's side armor panels 9 and front armor panels 11. For example, the health of the armor panels 9, 11, may be indicated on the display 8 by a color-coding system, where green armor indicates no damage detected by the embedded armor sensors, yellow indicates detection of damage that is less than critical, and red indicates critical damage. Alternatively, the health of the armor panels may be indicated numerically, such as by a number on a scale of 1 to 5, or by any other graphical or visual means for providing a decision maker with a clear and fast way to assess the relative armor health of one or more vehicles.

Figure 3:
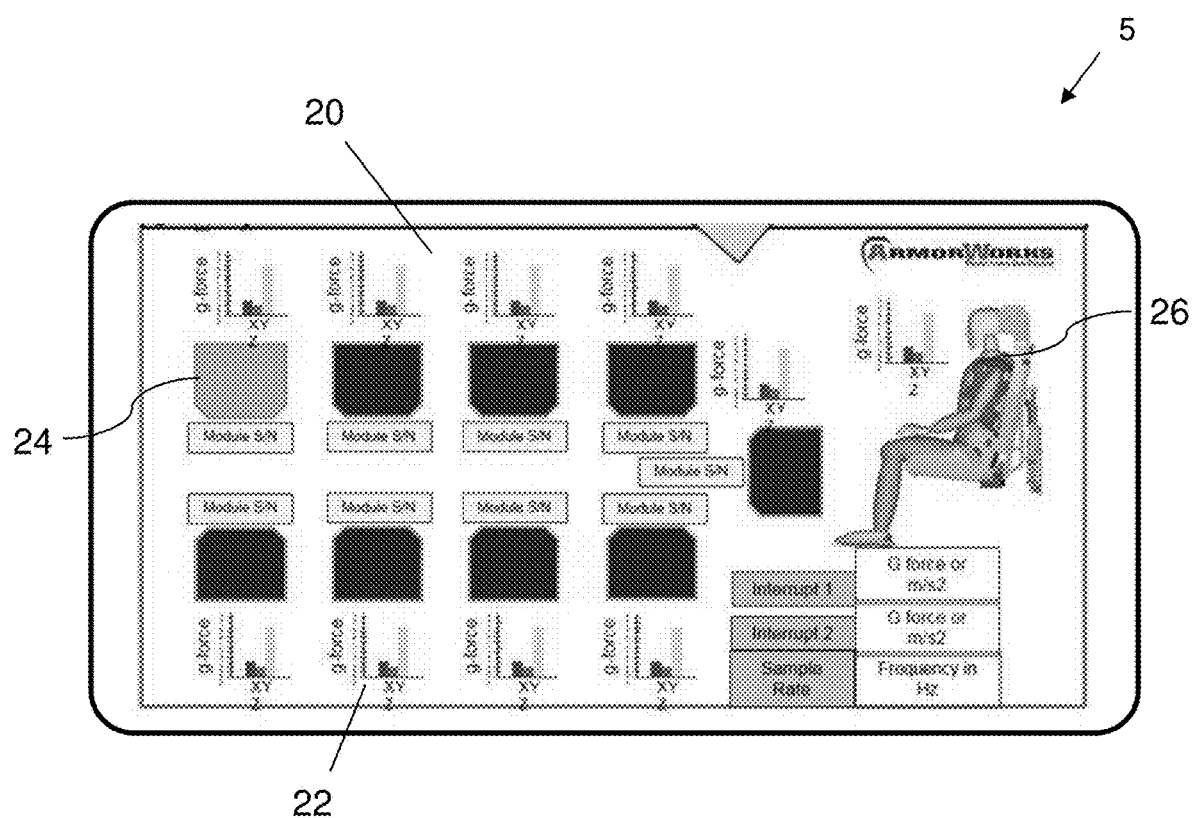
FIG. 3 is another representation of the data monitor with another exemplary visual graphic display showing health information about vehicle seats and seat occupants.

FIG. 3 is an example of the data monitor 5 showing a vehicle seat health display 20 that schematically represents the vehicle seat locations inside a vehicle, where each seat is identified for example by a serial number. The health of each seat is represented by a graphical display that provides information about the size of a shock induced to a seat occupant. For example, the depicted shock displays 22 show g-force experienced by the seat in x, y, and z orthogonal directions in a bar graph format. In addition, the seat health display may use color (or some other indicator of degree or severity) as an indication of health in a similar manner to that discussed above with regard to the vehicle armor. In one embodiment each one of the seat pan graphic representations 24 is shown in green, yellow, or red to indicate the degree to which the seat shock attenuating capability has been compromised.

The display may further include a graphic representation of a seat occupant 26 that is configured to convey a prediction of occupant health for any particular seat when a system user selects or clicks on a desired seat pan 24 on the display. Colors such as green, yellow, and red may be used here again to indicate occupant health at the selected seat location. In one embodiment the occupant display 26 is further capable of using color to separately indicate the health of various portions of the occupant display 26, such as back, pelvis, legs, arms, etc. In the depicted embodiment for example, the back of the occupant 26 is displayed red, the pelvis green, and the upper legs blue. Thus, the display 20 may be used not only to obtain information about the health of each seat, but also a prediction about the physical condition of the occupant of each seat.

The vehicle armor, seat, and seat occupant data may be coupled with a smart vehicle seat system that in addition to providing the seat and occupant data to the system 1, also optimizes seat performance in real time with respect to vibration damping and blast attenuation. Such a system is disclosed in a co-pending and co-owned U.S. Utility patent application Ser. No. 16/362,410, entitled "Smart Vehicle Seating System", the entire contents of which are incorporated herein by reference.

Figure 4:
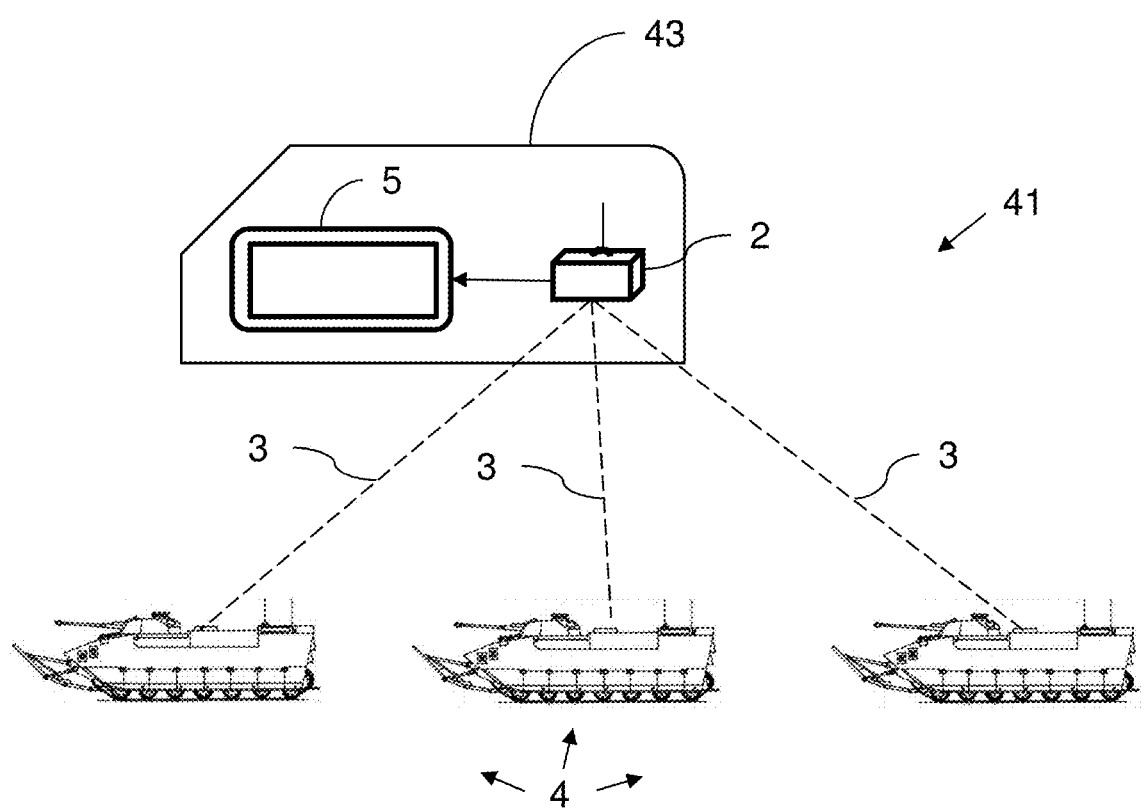
FIG. 4 is a schematic representation of a multi-vehicle embodiment of the smart vehicle health system of the present disclosure.

Referring to FIG. 4, the smart vehicle system may be a multi-vehicle system 41 comprising a plurality of smart vehicles 4 in a convoy, squad, or other organized grouping, wherein each smart vehicle is equipped with sensors 6, and with a processor 7 configured to transmit a data signal to the remotely located data receiver 2. In this embodiment the data receiver is configured to simultaneously receive data signals from the plurality of smart vehicles over wireless links 3, and the monitor 5 is configured to display vehicle health information for the plurality of smart vehicles based on vehicle component or system health information in the transmitted data signals. The monitor may be further configured to present a plurality of selectable visual displays indicating a relative health of selected vehicle components or systems for each of the plurality of smart vehicles.

In another embodiment of the multi-vehicle system, the remotely located data receiver and the monitor are on a remotely located vehicle, indicated in FIG. 4 at reference numeral 43. In a version of this embodiment, the remotely located vehicle is a smart vehicle with sensors and a processor configured to transmit a data signal to any of a plurality of additional data receivers. In another version the additional data receivers are on the plurality of smart vehicles, along with a monitor, wherein each of the plurality of smart vehicles can transmit and receive vehicle health information from any of the plurality of smart vehicles. Such sharing of the above discussed categories of health data between vehicles of a unit on convoy may be strategically utilized, for example, by allowing the units to assess one another's strengths and provide assistance or request assistance if needed during an engagement.

Figure 5:
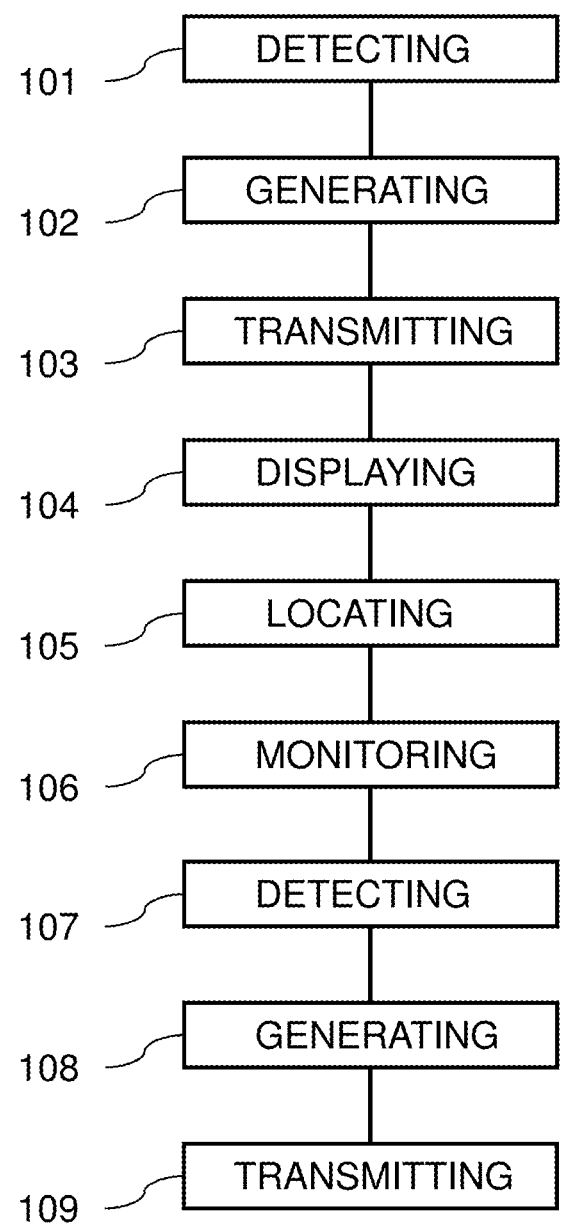
FIG. 5 is a block diagram illustrating a method of remotely accessing and monitoring vehicle component and system health information utilizing the smart vehicle health system of the present disclosure.

Referring now to FIG. 5, the smart vehicle health system further comprises a method of remotely accessing and monitoring vehicle component and system health information. In one embodiment the method comprises: a step 101 of detecting a health parameter indicative of a relative health of certain vehicle components or systems with sensors on a first vehicle; a step 102 of generating a data signal containing vehicle component or system health information based on data from the sensors; a step 103 of transmitting the data signal from the first vehicle to a remotely located data receiver; and a step 104 of displaying vehicle health information on a monitor connected to the data receiver and configured to present a plurality of selectable visual displays indicating the health of the certain vehicle components or systems based on the vehicle component or system health information in the transmitted data signal.

The above method may further comprise: a step 105 of locating the remotely located data receiver and the monitor in a second vehicle; and a step 106 of monitoring the health of the certain vehicle components or systems of the first vehicle from the second vehicle.

The above method may still further comprise: a step 107 of detecting a health parameter indicative of a relative health of certain vehicle components or systems with sensors on the second vehicle; a step 108 of generating a data signal containing vehicle component or system health information based on data from the sensors on the second vehicle; and a step 109 of transmitting the data signal from the second vehicle to a data receiver located on the first vehicle.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under § 112, 6th paragraph is not intended. Additionally, it is not intended that the scope of patent protection afforded the present invention be defined by reading into any claim a limitation found herein that does not explicitly appear in the claim itself.

What is claimed is:

1. A method of remotely accessing and monitoring vehicle component or system health information in a battlefield environment, and using that health information in real time to take strategic action, comprising the steps of:
providing a group of strategically deployed smart vehicles;
detecting a health parameter indicative of a relative health of certain vehicle components or systems with sensors on the smart vehicles;
generating a data signal at each vehicle containing health information about the certain vehicle components or systems based on data from the sensors;
transmitting the generated data signals from the vehicles to a remotely located data receiver;
accessing the health information about the certain vehicle components or systems contained in the transmitted data signals from the vehicles;
determining the needs of the group of vehicles in view of the accessed health information and overall strategic situation; and
taking strategic action in real time to address the needs of the group of vehicles.

2. The method of claim 1, wherein the step of taking strategic action comprises redirecting one or more vehicles of the group to improve the strategic situation, or providing medvac to one or more vehicles of the group.

3. The method of claim 2, wherein the certain vehicle components or systems are any of a group comprising vehicle survivability systems, vehicle powertrain, vehicle mobility components, and ammunition capacity.

4. The method of claim 3, wherein vehicle survivability systems comprise vehicle ballistic armor panels and blast attenuating seats.

5. The method of claim 1, wherein the step of accessing the health information about the certain vehicle components or systems contained in the transmitted data signals from the vehicles comprises receiving the transmitted data signals through a wireless link using a data receiver.

6. The method of claim 5, wherein the step of determining the needs of the group of vehicles in view of the accessed health information and overall strategic situation comprises displaying the health information on a monitor connected to the data receiver.

7. The method of claim 6, wherein displaying the health information on a monitor comprises displaying visual representations of one or more of the smart vehicles and associated selected components or systems of those smart vehicles.

8. The method of claim 7, wherein the data monitor is configured to toggle between vehicles and between components or systems of the vehicles.

9. The method of claim 7, wherein the visual representations of one or more of the smart vehicles and associated selected components or systems of those smart vehicles comprises a visual representation of armor panels on the vehicle with a visual indication of a health condition of the armor panels.

10. The method of claim 9, wherein the visual indication of the health condition of the armor panels comprises a color-coding system in which the armor panels are displayed in one of a group of pre-defined colors, each color representative of a particular health condition.

11. The method of claim 7, wherein the visual representations of one or more of the smart vehicles and associated selected components or systems of those smart vehicles comprises a schematic representation of vehicle seat locations inside the smart vehicle, and a visual representation of a seat health condition at each seat location.

12. The method of claim 11, wherein the visual representation of a seat health condition is a graphical display showing a size of a maximum shock load experienced by an occupant at the seat location.

13. The method of claim 11, wherein the visual representation of a seat health condition comprises a color-coding system in which each seat location is displayed in a color representative of a particular health condition at that seat location.

14. The method of claim 11, wherein a visual representation of a seat health condition at each seat location comprises a prediction of a health condition of a seat occupant.

15. The method of claim 1, further comprising the step of collecting and downloading recorded data indicative of unseen damage to vehicle armor and seating systems.

16. The method of claim 1, wherein each smart vehicle further comprises a processor configured to generate a data signal containing vehicle component or system health information based on data from the sensors, and transmit the data signal from the vehicle.

* * * * *